(12) United States Patent
Pinel

(10) Patent No.: US 10,575,061 B1
(45) Date of Patent: Feb. 25, 2020

(54) PROVIDING TEXTUAL INSTRUCTIONS FROM A VIDEO CAPTURE

(71) Applicant: International Business Machines Corporation, Armonk, NY (US)

(72) Inventor: Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/109,872

(22) Filed: Aug. 23, 2018

(51) Int. Cl.
  *H04N 21/488* (2011.01)
  *G06K 9/00* (2006.01)
  *G10L 15/18* (2013.01)
  *G10L 15/26* (2006.01)

(52) U.S. Cl.
  CPC ..... *H04N 21/4882* (2013.01); *G06K 9/00751* (2013.01); *G06K 9/00765* (2013.01); *G10L 15/1815* (2013.01); *G10L 15/265* (2013.01)

(58) Field of Classification Search
  None
  See application file for complete search history.

(56) References Cited

U.S. PATENT DOCUMENTS

| 9,721,008 | B1 * | 8/2017 | Byron | G06F 17/277 |
|---|---|---|---|---|
| 2007/0114224 | A1 | 5/2007 | Nagamitsu et al. | |
| 2007/0273696 | A1 * | 11/2007 | Cheng | G06K 9/00771 |
| | | | | 345/467 |
| 2009/0258331 | A1 | 10/2009 | Do et al. | |
| 2009/0259688 | A1 | 10/2009 | Do et al. | |
| 2013/0036353 | A1 * | 2/2013 | Zavesky | H04L 65/1093 |
| | | | | 715/716 |
| 2013/0129307 | A1 * | 5/2013 | Choe | H04N 5/2621 |
| | | | | 386/227 |
| 2013/0174026 | A1 * | 7/2013 | Locke | G06F 17/24 |
| | | | | 715/254 |
| 2013/0177296 | A1 * | 7/2013 | Geisner | H04N 9/80 |
| | | | | 386/241 |
| 2015/0235089 | A1 * | 8/2015 | Lee | G06K 9/00718 |
| | | | | 382/103 |
| 2015/0281549 | A1 * | 10/2015 | Fridental | H04N 5/23206 |
| | | | | 348/211.3 |

(Continued)

OTHER PUBLICATIONS

An, "PIC2DISH: A Customized Cooking Assistant System." In Proceedings of the 2017 ACM on Multimedia Conference (MM '17). ACM, New York, NY, USA, 1269-1273, 2017.

(Continued)

*Primary Examiner* — Alexander Q Huerta
(74) *Attorney, Agent, or Firm* — Jared L. Montanaro

(57) ABSTRACT

A processor may receive recording information. The processor may identify one or more components within the recording information. The one or more components may include audio and visual representations of the one or more components. The processor may determine a size, an amount, and a structure for each of the one or more components. The processor may monitor one or more actions of a user present in the recording information. The processor may analyze each of the one or more actions of the user. The processor may use video content analysis and natural language processing techniques to analyze the one or more actions of the user. The processor may generate a set of textual instructions based on the analysis of each of the one or more actions of the user. The processor may display the set of textual instructions to a second user.

20 Claims, 8 Drawing Sheets

(56) References Cited

U.S. PATENT DOCUMENTS

| | | | | |
|---|---|---|---|---|
| 2016/0055381 A1* | 2/2016 | Adsumilli | .......... | G06K 9/00751 386/241 |
| 2016/0316265 A1* | 10/2016 | Gopalan | ................ | H04N 21/84 |
| 2017/0103676 A1 | 4/2017 | Allen et al. | | |
| 2017/0118507 A1* | 4/2017 | Latacz | ................ | G11B 27/007 |
| 2017/0169853 A1* | 6/2017 | Hu | ...................... | H04N 21/233 |
| 2018/0268865 A1* | 9/2018 | Ekambaram | ............ | G06F 3/011 |

OTHER PUBLICATIONS

Charrondiere et al., "FAO/INFOODS Databases," Density Database Version 2.0, http://www.fao.org/docrep/017/ap815e/ap815e.pdf, 2012, 24 pgs.

Chen et al., "Deep-based Ingredient Recognition for Cooking Recipe Retrieval," In Proceedings of the 2016 ACM on Multimedia Conference (MM '16). ACM, New York, NY, USA, 32-41. 2016.

Chu, M., "Sauteed Spinach," Recipe File, Cooking for Engineers, http://www.cookingforengineers.com/, printed Jun. 27, 2018, 3 pgs.

Hayashi, "Automatic authoring of a domestic cooking video based on the description of cooking instructions." In Proceedings of the 5th international workshop on Multimedia for cooking & eating activities (CEA '13). ACM, New York, NY, USA, 21-26, 2013.

Herranz, "Food recognition and recipe analysis: integrating visual content, context and external knowledge." (Submitted on Jan. 22, 2018), https://arxiv.org/abs/1801.07239.

Murakami, "Cooking Procedure Recognition and Support by Ubiquitous Sensors." Journal of Robotics and Mechatronics vol. 21, No. 4, 2009, pp. 498-506.

Ooi, "Sustained Attention Function Evaluation During Cooking Based on Egocentric Vision," 2017 IEEE International Symposium on Multimedia (ISM), Taichung, 2017, pp. 107-113.

Unknown, Carnegie Mellon University Recipe Database, http://www.cs.cmu.edu/%7Eark/CURD/, printed Jun. 27, 2018, 1 pg.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

PROVIDING TEXTUAL INSTRUCTIONS FROM A VIDEO CAPTURE

BACKGROUND

The present disclosure relates generally to the field of video object recognition, and more specifically to creating instruction lists based on video captured tutorials.

Video capturing of everyday activities has become commonplace in today's society. Individuals regularly view "How To" videos online and television shows that teach viewers how to perform certain tasks (e.g., building a fence, planting a garden, refinishing furniture, etc.). However, with the rise of technology and efficiencies of individuals who seek to "DIY" (Do it yourself), time seems to have become scarcer. As a result, taking the time to write instructions down, at each individual step of a project, has become overly cumbersome.

SUMMARY

Embodiments of the present disclosure include a method, computer program product, and system for creating textual tutorial, procedural, and/or instruction lists from video captures. A processor may receive recording information. The processor may identify one or more components within the recording information. The one or more components may include audio and visual representations of the one or more components. The processor may determine a size, an amount, and a structure for each of the one or more components. The processor may monitor one or more actions of a user present in the recording information. The processor may analyze each of the one or more actions of the user. The processor may use video content analysis and natural language processing techniques to analyze the one or more actions of the user. The processor may generate a set of textual instructions based on the analysis of each of the one or more actions of the user. The processor may display the set of textual instructions to a second user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
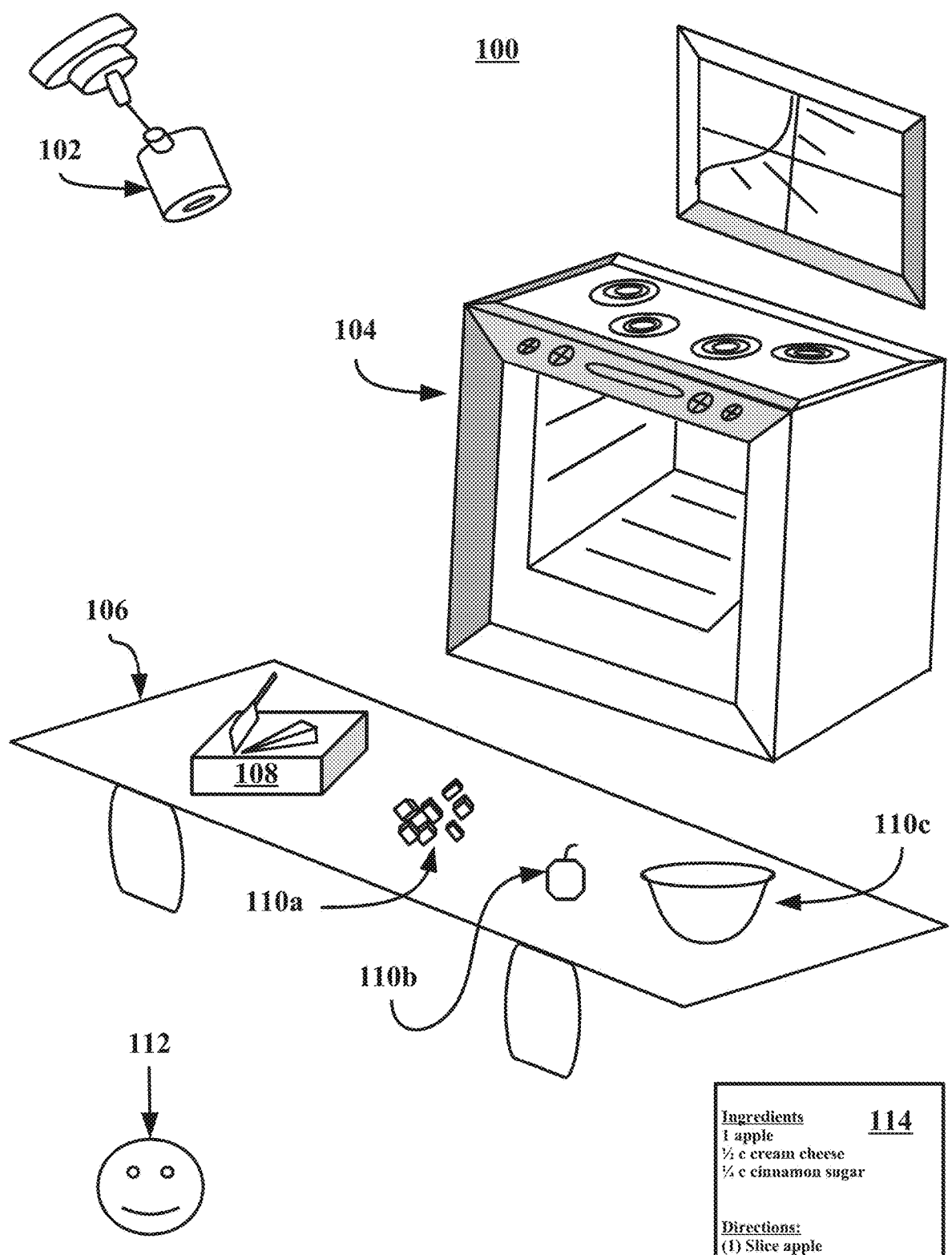
FIG. 1 illustrates a block diagram of an example system in which recording information is received, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of video object recognition, and more specifically to creating instruction lists based on video captured tutorials. While the present disclosure is not necessarily limited to such applications, various aspects of the disclosure may be appreciated through a discussion of various examples using this context. While engaging in specialized actions, such as activities or hobbies (e.g., cooking, dancing, knitting, building model cars, conducting lab experiments, etc.), a first user may wish to document the action in the form of a textual instruction (e.g., via print out, email, portable document format, text messaging, screen sharing, etc.). It is helpful to have these procedures documented in a textual format, in order to ensure the same or similar results in the future. In addition, sometimes a first user may wish to share the actions associated with a certain procedure with a second user. However, it is often distracting and bothersome to stop at each step of a procedure to write down the details of how to perform that action. As a result, a user may want to record the actions performed in a seamless way and deal with the textual instructions at another time.

In some embodiments, a processor may receive recording information. The processor may identify one or more components within the recording information. The one or more components may include audio and visual representations of the one or more components. The processor may determine a size, an amount, and a structure for each of the one or more components within the recording information. The processor may monitor one or more actions of a user present in the recording information. The processor may analyze each of the one or more actions of the user. The analyzing of each of the one or more actions of the user may include video content analysis and natural language processing techniques. The processor may generate a set of textual instructions. The set of textual instructions may be based on the analysis of each of the one or more actions of the user. The processor may display the set of the textual instructions to a second user.

For example, a user may be in a kitchen preparing a meal. The user may like to experiment with an idea for a new recipe, but have little time between each step in the process to write down what is done at each of the steps (e.g., due to various cooking times of ingredients, etc.). Thus, the user may have set up a smartphone to video record the whole process. While receiving the recording information, an application installed on (or native to [e.g., on firmware of the smartphone]) the smartphone may detect various components, including the user, ingredients, and cooking implements within the kitchen (e.g., the recording environment, the recording area, etc.). At the same time that the application is recording the user's actions in the kitchen, it may also distinguish between each component (e.g., the ingredients and cooking implements) in the kitchen and analyze the user's interactions with the ingredients and cooking implements as a whole. In some embodiments, the application may analyze the user's interactions with the ingredients and cooking implements, and the interactions of each of the other components with the cooking implements, independently of the user. In some embodiments, each of the interactions may be done simultaneously. When the user is done preparing the meal, the application may provide the user with a set of textual instructions of the recipe and process, based on the user's actions analyzed in the kitchen. The user may now be able to store the new textual recipe and more easily share the new recipe with others.

In some embodiments, the processor may determine the size, the amount, and the structure of the one or more components by identifying dimensions of the one or more components, using technologies such as, stereo vision measurement, etc. Based on the identified dimensions, the processor may determine a surface area, a volume, and a weight of each of the one or more components. The processor may access a repository that may include reference components (e.g., an internal or external database of previously reviewed ingredients, utensils, modules, etc.). The processor may compare structural similarities and differences among each of the one or more components to the reference components stored in the repository. Based on the comparing, the processor may determine an arrangement (e.g., physical state, physical composition, physical position, etc.) of each of the one or more components.

For example, a user may decide to place items, or components, such as, two whole potatoes, one knife, a pan, a slotted spoon, and a bottle of cooking oil on a counter top, within a recording area. A recording device may then begin sending recording information of the recording area to a processor. The processor may identify each of the items, or components, in the recording area (e.g., using computer vision, etc.), and determine the size and quantities of each item or component. Next, the processor may access an internal or external repository (e.g., a nutritional database, a food registry, etc.) to compare the components to known components based on the size and shape of the components captured in the video. For example, having determined that the potatoes on the counter are about 4" long, the processor sees in a nutrition/unit conversion database (e.g., [USDA] National Nutrient Database, etc.) that the potatoes are considered medium-size potatoes, weighing approximately 300 grams. Upon determining which items, or components, were included in the recording information, the processor may record the information in a textual format of recipe ingredients that lists the exact size and amount of the items or components.

In some embodiments, the processor may monitor the one or more actions of the user present in the recording. The processor may parse the recording into one or more segments. The processor may group the one or more segments by associating one or more key identified actions as a sequence of actions. The processor may compare the one or more key identified actions to one or more reference actions stored in the internal and/or the external repository (e.g., a database of cutting techniques, cooking techniques, etc.). The processor may use machine learning (e.g., convolutional neural networks, etc.) to recognize a first key identified action. The processor may determine that a first key identified action matches a first reference action. The processor may assign a tag to a first segment associated with the first key identified action. The tag may identify content of the first key identified action. The processor may predict (e.g., forecast, estimate, project, etc.) one or more subsequent actions associated with the first key action. The processor may generate a set of instructions based on the one or more subsequent actions.

Following the example above, the user may pour oil into a pan, place the pan on top of a burner on a stove, and turn the burner on to a temperature corresponding to medium-high heat. Next, the user may cut the potatoes lengthwise into strips. Meanwhile, the processor may identify the user's above-mentioned actions (e.g., pouring oil, placing the pan, turning the burner knob, and cutting the potatoes) and compare them to reference actions in a culinary technique repository. The processor may group and tag the actions, as a sequence of actions (e.g., "pouring oil," which may include the steps of picking up the container of oil and tilting the container to pour the contents out is considered as a "single"/solitary action; "placing the pan," which may include the steps of picking up the pan from one surface and putting it down on a second surface is considered as another "single" action, etc.) as the actions are identified by the comparing. In some embodiments, each of the actions may be grouped as a sequence of actions to avoid a grouping of individual actions into segments based on the primary verb (e.g., such as "pouring", "placing", "turning", "cutting", etc.).

Continuing the example, the processor may determine that the recording area includes ingredients, such as the two potatoes, and that the recording area also includes cooking implements, such as the pan, the slotted spoon, the knife, and the oil that will be used to create a recipe that will need to be transcribed. Based on the ingredients and the cooking implements, the processor may determine that the user is preparing French fries and predict the next steps that the user will perform. The processor may in turn generate a set of instructions in recipe format (e.g., in a textual list that describes the cooking times and amounts of each identified ingredient) at the same time the user is preparing the recipe.

In some embodiments, a user may interact with an automatically generated satisfaction application that may be generated after the user has received, by the processor, a set of textual instructions (e.g., a recipe). The user may indicate in the application the degree of satisfaction the user felt towards that particular recipe (e.g., using a five-star rating system, including a "User Notes" section, etc.). The processor may prompt the user with additional questions in order to learn what the user prefers or does not prefer in future recipes. The processor may further tag recipes with indications of the degree of satisfaction in order to help predict actions in future sessions. For example, if a user indicates that a particular recipe should receive one star out of five stars, the processor will downgrade that recipe in importance for comparison purposes. Additionally, the processor will prompt the user to indicate what about the recipe (e.g., the cooking time, quality of ingredients, cooking mode or technique, arrangement of ingredients, etc.) the user would like to especially highlight as something to change in the future.

In some embodiments, if the user followed the predicted steps and it was determined, by continuing to analyze the user's actions, that the user liked the recipe (e.g., by eating the entire meal, saving the recipe, etc.), the processor may store the recipe and utilize it for a subsequent recipe. The storing of the recipe and the predicting of subsequent steps allows the processor to more efficiently and quickly search repositories and to more efficiently and quickly provide information to the user.

In some embodiments, the processor may analyze the video content of each of the one or more actions by identifying one or more distinct features of the one or more audio and visual representations of the one or more components that alter the structure of the one or more components. The processor may determine that the user present in the recording information is performing the one or more actions. The processor may compare the one or more actions with reference actions that may be stored in a repository. The reference actions may additionally include predicted subsequent actions. The processor may generate a first predicted action based on a first reference action associated with a first action of the one or more actions. The first predicted action may be subsequent to the first action and the first predicted action may maintain continuity with the first action.

For example, as a first action, a user may pick up a russet potato and begin to peel the outer layer of skin off. Several preparation options for potatoes are available to the user (e.g., French fries, mashed, baked, etc.). However, the processor may rule out "baked" potato as an option, because the user has begun peeling the potato—an uncharacteristic action, or an action that the processor would not associate with baking a potato. Additionally, the processor may be able to predict which type of preparation the user will choose based on the other items or components in the recording area or the other actions already performed. For example, if the processor identifies a pot of water on the stovetop, a "masher," and some milk on the counter, the processor may predict that the user is going to prepare mashed potatoes. Additionally, the processor may predict that the user will consequently begin cutting the potato into quarters. In some embodiments, the predicting helps increase the efficiency of the processor in its learning capabilities by enabling the processor to queue likely associated actions with video segments and/or natural language phrases.

In some embodiments, the processor may analyze each of the one or more actions using natural language processing and natural language generation techniques by identifying a second action of the one or more actions. The second action may correspond to a natural language phrase. The processor may compare the natural language phrase to one or more phrases in a natural language repository. The processor may generate a first predicted subsequent phrase, based on the comparing of the natural language phrase to the one or more phrases. The first predicted subsequent phrase may maintain continuity with the natural language phrase.

For example, the processor may identify that the user has cracked two eggs into a mixing bowl and has begun stirring them with a fork. The processor may represent this last action as a tuple in the following format: {stir, eggs, fork}. In order to transform this tuple into a natural language phrase, the processor may compare the tuple with others already stored in a repository. The repository may have been created by using natural language processing to parse a corpus of existing recipes and transforming each recipe step into one or more tuples consisting of (e.g., an action, one or more ingredients, one or more cooking utensils, one or more appliances, etc.). The recipe corpus may have contained a recipe for artisan scrambled eggs, and the processor may have converted one of the steps of that recipe (e.g., "vigorously beat the eggs with a fork") into the tuple{stir, eggs, fork}. The processor may then determine that the tuple {stir, eggs, fork} is more commonly referred to in natural language as "vigorously beat the eggs with a fork". The processor may then generate a recipe step in natural language for the user's action by reusing the phrase "vigorously beat the eggs with a fork".

In some embodiments, the processor may perform the second action/reverse operation, e.g., receive a set of textual instructions and produce a matching video recording. The set of textual instructions may include one or more described actions (e.g., a recipe format, etc.). The processor may analyze a repository for existing recording segments that are associated with the one or more described actions. The processor may generate a media communication by compiling the existing recording segments.

For example, a user may desire a video tutorial showing the user how to prepare a particular recipe. The user submits the textual recipe to the application and receives a video portrayal of the recipe, or parts of the recipe, the user would like a video demonstration of.

In some embodiments, the processor may analyze the repository for existing recording segments by identifying one or more tags associated with the existing recording segments within the repository. The processor may compare the one or more tags to the one or more described actions. The processor may determine, based on the comparison, that a first tag matches a first described action. The first tag and the first described action may match by including the same textual instructions. The processor may use tuples consisting of action verbs, ingredients, and tools to compare recording segments and recipe steps. The processor may display the first existing recording segment associated with the first tag to a second user.

In some embodiments, the user may request a recording segment for a single step of a recipe. For example, the user may desire a video demonstration of one type of cooking technique, such as different ways to cut an onion. The processor may identify existing tags associated with cutting an onion and display one or more of the options to the user.

Referring now to FIG. 1, illustrated is example recording environment 100, in accordance with some embodiments of the present disclosure. In some embodiments, the recording environment 100 may include a recording device 102 (e.g., that includes a processor, is on a mobile device, is on a phone, is a camera, etc.) that receives video capture of activities performed within view of the recording device 102. In some embodiments, and discussed below in further regard to FIG. 1, the video capture of activities performed are used for generating a set of textual instructions 114 (e.g., as a print out, on a mobile device, on the screen of the recording device 102, in an email, as a portable document file, etc.).

In some embodiments, the recording environment 100 further includes an oven 104, a table 106, a cutting board 108, a pile of caramel cubes 110*a*, an apple 110*b*, a bowl 110*c* (e.g., sometimes referred to as components 110*a-c*), and a user 112. In some embodiments, the cutting board 108 includes a knife and wedge of cheese (not labeled).

In some embodiments, the recording device 102 will monitor the recording area 100. In some embodiments, the monitoring may include analyzing the actions of user 112. For example, the user 112 may grab the knife from the cutting board 108 and dice the apple 110*b*. The processor may determine that the apple 110*b* began as one medium-sized apple (e.g., by determining the size of the apple and comparing it to samples in a nutritional database, etc.). After the apple 110*b* is in a diced arrangement, the processor may determine that the new arrangement consists of one cup of the apple 110*b* in a diced form.

Continuing the example, the processor may continue to monitor the components within the recording information, including the user 112. The processor may predict that the user 112 will be eating alone based on a number of factors (e.g., comparing the amount of ingredients in the recording information with an internal or external repository that shows the same amounts are generally single-serve recipes; the time of day the person is preparing the meal (e.g., midnights snacks, etc.); analysis of past cooking performance by the user 112; the absence of other users present in the recording information; etc.). The processor may then assign a tag to the recording information that indicates the recipe is a single-serve recipe and predict cooking measurements accordingly. The processor may additionally generate the textual instructions 114 corresponding to the predicted cooking measurements that are associated with the single-serve designation.

Continuing the example, the processor may categorize the recipe under "healthy snack foods," based on the inclusion of the apple 110*b* and cheese. In some embodiments, the processor may categorize the recipe as "comfort food snacks," based on the inclusion of the caramel cubes 110*a* and upon determining that the user 112 appears despondent.

Figure 2:
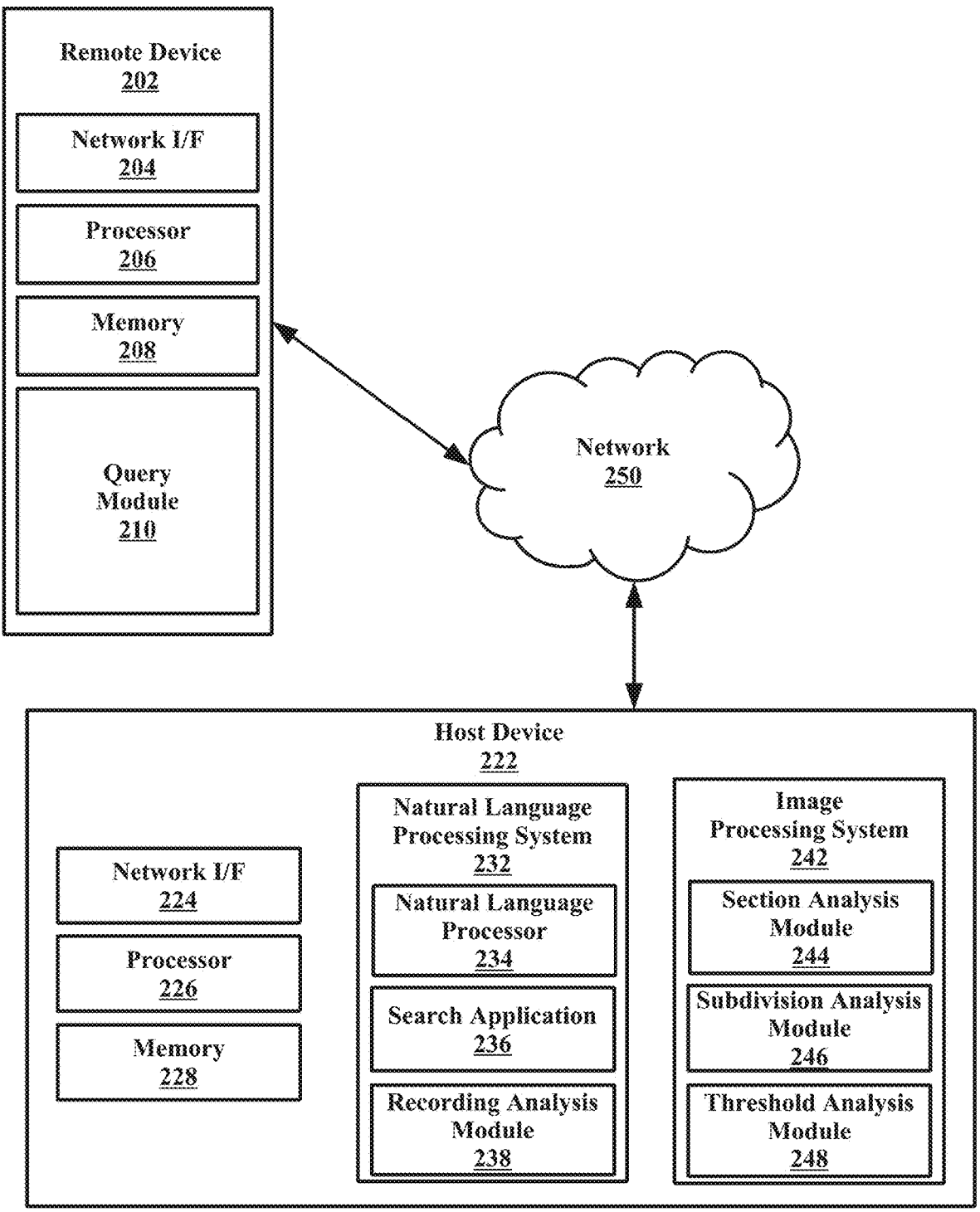
FIG. 2 illustrates a block diagram of an example computing environment in which illustrative embodiments of the present disclosure may be implemented.

As discussed above, aspects of the disclosure may relate to natural language processing. Accordingly, an understanding of the embodiments of the present disclosure may be aided by describing embodiments of natural language processing systems and the environments in which these systems may operate. Referring now to FIG. 2, illustrated is a block diagram of an example computing environment 200 in which illustrative embodiments of the present disclosure may be implemented. In some embodiments, the computing environment 200 may include a remote device 202 and a host device 222.

Consistent with various embodiments, the host device 222 and the remote device 202 may be computer systems. The remote devices 202 and the host device 222 may include one or more processors 206 and 226 and one or more memories 208 and 228, respectively. The remote device 202 and the host device 222 may be configured to communicate with each other through an internal or external network interface 204 and 224. The network interfaces 204 and 224 may be modems or network interface cards. The remote device 202 and/or the host device 222 may be equipped with a display or monitor (not shown). Additionally, the remote device 202 and/or the host device 222 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote device 202 and/or the host device 222 may be servers, desktops, laptops, or hand-held devices.

The remote device 202 and the host device 222 may be distant from each other and communicate over a network 250. In some embodiments, the host device 222 may be a central hub from which remote device 202 can establish a communication connection, such as in a client-server networking model. Alternatively, the host device 222 and remote device 202 may be configured in any other suitable networking relationship (e.g., in a peer-to-peer configuration or using any other network topology).

In some embodiments, the network 250 can be implemented using any number of any suitable communications media. For example, the network 250 may be a wide area network (WAN), a local area network (LAN), an internet, or an intranet. In certain embodiments, the remote device 202 and the host device 222 may be local to each other, and communicate via any appropriate local communication medium. For example, the remote device 202 and the host device 222 may communicate using a local area network (LAN), one or more hardwire connections, a wireless link or router, or an intranet. In some embodiments, the remote device 202 and the host device 222 may be communicatively coupled using a combination of one or more networks and/or one or more local connections. For example, the remote device 202 may be hardwired to the host device 222 (e.g., connected with an Ethernet cable) or the remote device 202 may communicate with the host device using the network 250 (e.g., over the Internet).

In some embodiments, the network 250 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 250.

In some embodiments, the remote device 202 may enable a user to input (or may input automatically with or without a user) a query to the host device 222 in order to identify subdivisions of a recording that include a particular subject. For example, the remote device 202 may include a query module 210 and a user interface (UI). The query module 210 may be in the form of a web browser or any other suitable software module, and the UI may be any type of interface (e.g., command line prompts, menu screens, graphical user interfaces). The UI may allow a user to interact with the remote device 202 to input, using the query module 210, a query to the host device 222, which may receive the query.

In some embodiments, the host device 222 may include a natural language processing system 232. The natural language processing system 232 may include a natural language processor 234, a search application 236, and a recording analysis module 238. The natural language processor 234 may include numerous subcomponents, such as a tokenizer, a part-of-speech (POS) tagger, a semantic relationship identifier, and a syntactic relationship identifier. An example natural language processor is discussed in more detail in reference to FIG. 3.

The search application 236 may be implemented using a conventional or other search engine, and may be distributed across multiple computer systems. The search application 236 may be configured to search one or more databases (e.g., repositories) or other computer systems for content that is related to a query submitted by the remote device 202. For example, the search application 236 may be configured to search its own repository, recipe databases, cooking blogs, magazines, archived recipe books, etc. to help identify a particular subject related to a query provided for a cooking class video. The recording analysis module 238 may be configured to analyze a recording to identify a particular subject (e.g., of the query). The recording analysis module 238 may include one or more modules or units, and may utilize the search application 236, to perform its functions (e.g., to analyze a recording information to generate a set of textual instructions), as discussed in more detail in reference to FIG. 3.

In some embodiments, the host device 222 may include an image processing system 242. The image processing system 242 may be configured to analyze images associated with the recording to create an image analysis. The image processing system 242 may utilize one or more models, modules, or units to perform its functions (e.g., to analyze the images associated with the recording information and generate a set of textual instructions). For example, the image processing system 242 may include one or more image processing models that are configured to identify specific images related to components identified in a recording area. The image processing models may include a section analysis module 244 to analyze single images associated with the recording and to identify the location of one or more features of the single images. As another example, the image processing system 242 may include a subdivision analysis module 246 to group multiple images together identified to have a common feature of the one or more features. In some embodiments, the image processing models may be implemented as software modules. For example, the image processing system 242 may include a section analysis module 244 and a subdivision analysis module 246. In some embodiments, a single software module may be configured to analyze the image(s) using the image processing models.

In some embodiments, the image processing system 242 may include a threshold analysis module 248. The threshold analysis module 248 may be configured to compare, the instances of a particular subject identified in a subdivision of sections of the recording against a threshold number of instances. The threshold analysis module 248 may then determine if the subdivision should be displayed to a user.

In some embodiments, the host device may have an optical character recognition (OCR) module. The OCR module may be configured to receive a recording sent from the remote device 202 and perform optical character recognition (or a related process) on the recording to convert it into machine-encoded text so that the natural language processing system 232 may perform NLP on the report. For example, the remote device 202 may transmit a video of a meal preparation process to the host device 222. The OCR module may convert the video into machine-encoded text, and then the converted video may be sent to the natural language processing system 232 for analysis. In some embodiments, the OCR module may be a subcomponent of the natural language processing system 232. In other embodiments, the OCR module may be a standalone module within the host device 222. In still other embodiments, the OCR module may be located on the remote device 202 and may perform OCR on the recording before the recording is sent to the host device 222.

While FIG. 2 illustrates a computing environment 200 with a single host device 222 and a remote device 202, suitable computing environments for implementing embodiments of this disclosure may include any number of remote devices and host devices. The various models, modules, systems, and components illustrated in FIG. 2 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze a video, and the second host device may include an image processing system configured to receive and analyze GIFS, to generate an image analysis.

It is noted that FIG. 2 is intended to depict the representative major components of an exemplary computing environment 200. In some embodiments, however, individual components may have greater or lesser complexity than as represented in FIG. 2, components other than or in addition to those shown in FIG. 2 may be present, and the number, type, and configuration of such components may vary.

Figure 3:
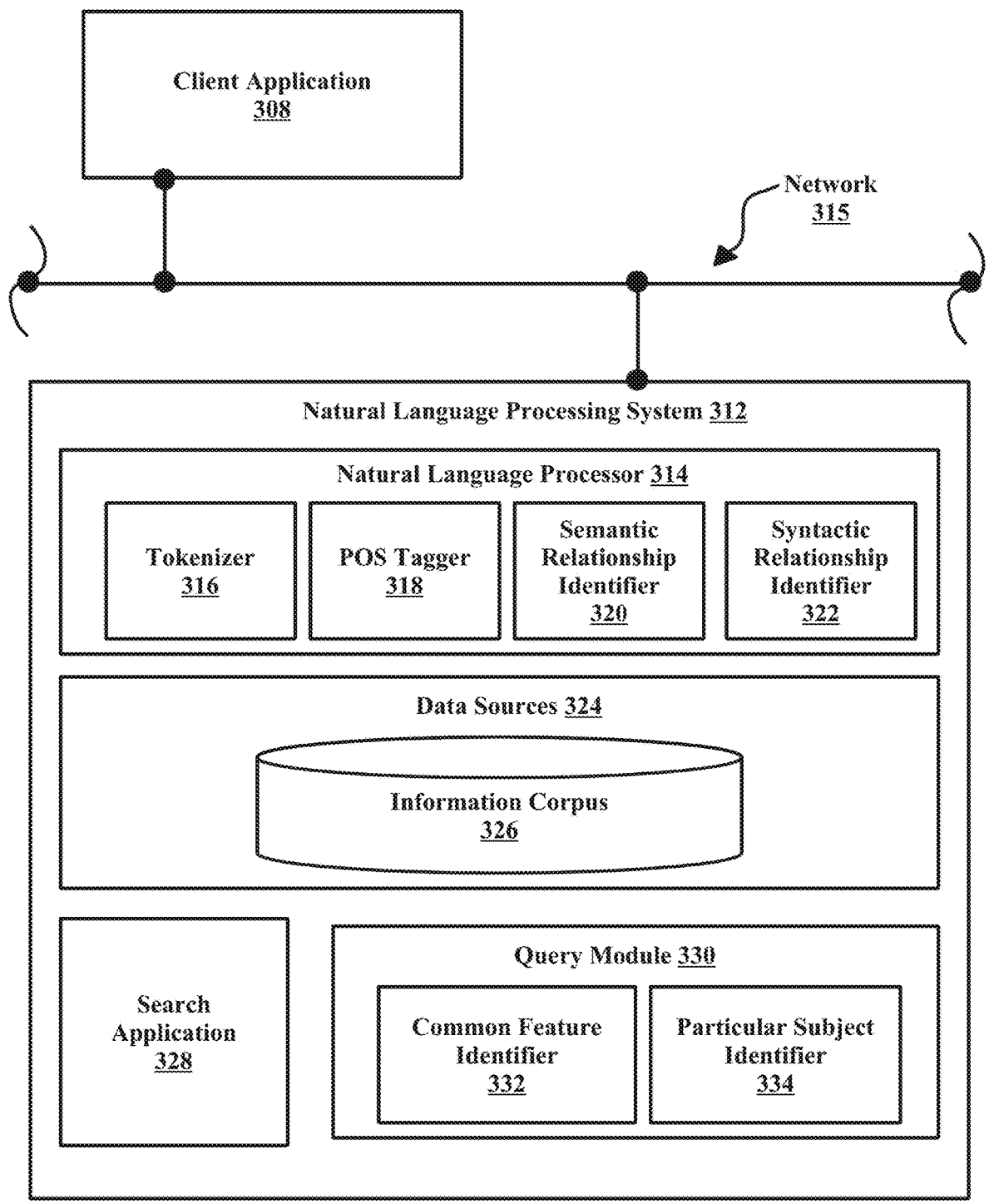
FIG. 3 illustrates a block diagram of an example natural language processing system configured to analyze a recording information to generate a set of textual instructions, in accordance with embodiments of the present disclosure.

Referring now to FIG. 3, shown is a block diagram of an exemplary system architecture 300, including a natural language processing system 312, configured to analyze a recording information to generate a set of textual instructions, in accordance with embodiments of the present disclosure. In some embodiments, the natural language processing system 312 is used to process a corpus of existing recipes and produce one or more tuples of cooking actions, ingredients, and/or tools, that can help with the subsequent generation of textual instructions using a natural language phrase. In some embodiments, the natural language processing system 312 processes an audio track of a recording to identify the user's speech and to determine whether the user is saying anything that should be transcribed and added to the generated textual instructions.

In some embodiments, a remote device (such as remote device 202 of FIG. 2) may submit a recording and/or a query to be analyzed to the natural language processing system 312 which may be housed on a host device (such as host device 222 of FIG. 2). Such a remote device may include a client application 308, which may itself involve one or more entities operable to generate or modify information associated with the recording and/or query that is then dispatched to a natural language processing system 312 via a network 315.

Consistent with various embodiments, the natural language processing system 312 may respond to query and recording submissions sent by a client application 308. Specifically, the natural language processing system 312 may analyze a received a recording and/or a query related to the recording to identify a particular subject in the recording. In some embodiments, the natural language processing system 312 may include a natural language processor 314, data sources 324, a search application 328, and a query module 330. The natural language processor 314 may be a computer module that analyzes the recording and the query. The natural language processor 314 may perform various methods and techniques for analyzing recordings and/or queries (e.g., syntactic analysis, semantic analysis, etc.). The natural language processor 314 may be configured to recognize and analyze any number of natural languages. In some embodiments, the natural language processor 314 may group one or more sections of a recording into one or more subdivisions. Further, the natural language processor 314 may include various modules to perform analyses of recordings. These modules may include, but are not limited to, a tokenizer 316, a part-of-speech (POS) tagger 318 (e.g., which may tag each of the one or more sections in which the particular subject is identified), a semantic relationship identifier 320, and a syntactic relationship identifier 322.

In some embodiments, the tokenizer 316 may be a computer module that performs lexical analysis. The tokenizer 316 may convert a sequence of characters (e.g., images, sounds, etc.) into a sequence of tokens. A token may be a string of characters included in a recording and categorized as a meaningful symbol. Further, in some embodiments, the tokenizer 316 may identify word boundaries in a recording and break any text within the recording (e.g., from closed-caption, etc.) into their component text elements, such as words, multiword tokens, numbers, and punctuation marks. In some embodiments, the tokenizer 316 may receive a string of characters, identify the lexemes in the string, and categorize them into tokens.

Consistent with various embodiments, the POS tagger 318 may be a computer module that marks up a word in a recording to correspond to a particular part of speech. The POS tagger 318 may read a passage or other text in natural language and assign a part of speech to each word or other token. The POS tagger 318 may determine the part of speech to which a word (or other spoken element) corresponds based on the definition of the word and the context of the word. The context of a word may be based on its relationship with adjacent and related words in a phrase, sentence, or paragraph. In some embodiments, the context of a word may be dependent on one or more previously analyzed recordings (e.g., the content of one recording may shed light on the meaning of one or more subjects in another recording). Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In some embodiments, the POS tagger 318 may tag or otherwise annotate tokens of a recording with part of speech categories. In some embodiments, the POS tagger 318 may tag tokens or words of a recording to be parsed by the natural language processing system 312.

In some embodiments, the semantic relationship identifier 320 may be a computer module that may be configured to identify semantic relationships of recognized subjects (e.g., words, phrases, images, etc.) in a recording. In some embodiments, the semantic relationship identifier 320 may determine functional dependencies between entities and other semantic relationships.

Consistent with various embodiments, the syntactic relationship identifier 322 may be a computer module that may be configured to identify syntactic relationships in a recording composed of tokens. The syntactic relationship identifier 322 may determine the grammatical structure of sentences such as, for example, which groups of words are associated as phrases and which word is the subject or object of a verb. The syntactic relationship identifier 322 may conform to formal grammar.

In some embodiments, the natural language processor 314 may be a computer module that may group sections of a recording into subdivisions and generate corresponding data structures for one or more subdivisions of the recording. For example, in response to receiving a recording at the natural language processing system 312, the natural language processor 314 may output subdivisions of the recording as data structures. In some embodiments, a subdivision may be represented in the form of a graph structure. To generate the subdivision, the natural language processor 314 may trigger computer modules 316-322.

In some embodiments, the output of natural language processor 314 may be used by search application 328 to perform a search of a set of (i.e., one or more) corpora to retrieve one or more subdivision including a particular subject associated with a query and send the output to an image processing system and to a comparator. As used herein, a corpus may refer to one or more data sources, such as the data sources 324 of FIG. 3. In some embodiments, the data sources 324 may include video libraries, data warehouses, information corpora, data models, and document repositories. In some embodiments, the data sources 324 may include an information corpus 326. The information corpus 326 may enable data storage and retrieval. In some embodiments, the information corpus 326 may be a subject repository that houses a standardized, consistent, clean, and integrated list of images and dialogue. For example, the information corpus 326 may include cooking terminology. The data may be sourced from various operational systems. Data stored in the information corpus 326 may be structured in a way to specifically address reporting and analytic requirements. In some embodiments, the information corpus 326 may be a relational database.

In some embodiments, the query module 330 may be a computer module that identifies common features within sections of a recording and a particular subject of a query in subdivisions of sections of the recording. In some embodiments, the query module 330 may include a common feature identifier 332 and a particular subject identifier 334. When a query is received by the natural language processing system 312, the query module 330 may be configured to analyze a recording using natural language processing to identify a particular subject. The query module 330 may first identity one or more subjects in the recording using the natural language processor 314 and related subcomponents 316-322. After identifying the one or more subjects, the common feature identifier 332 may identify one or more common features present in sections of the recording. In some embodiments, the common features in the sections may be the same subject that is identified. Once a common feature is identified, the common feature identifier 332 may be configured to transmit the sections that include the common feature to an image processing system (shown in FIG. 2) and/or to a comparator (shown in FIG. 2).

After identifying common features of a recording using the common feature identifier 332, the query module may group sections of the recording having common features into subdivisions. The particular subject identifier 334 may the identify a particular subject in subdivisions of the recording, based upon the query. In some embodiments, the particular subject may include one or more of the common features identified in the one or more sections of the recording. After identifying a particular subject relating to the query, the particular subject identifier 334 may be configured to transmit the criterion to an image processing system (shown in FIG. 2) and/or to a comparator (shown in FIG. 2).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 4:
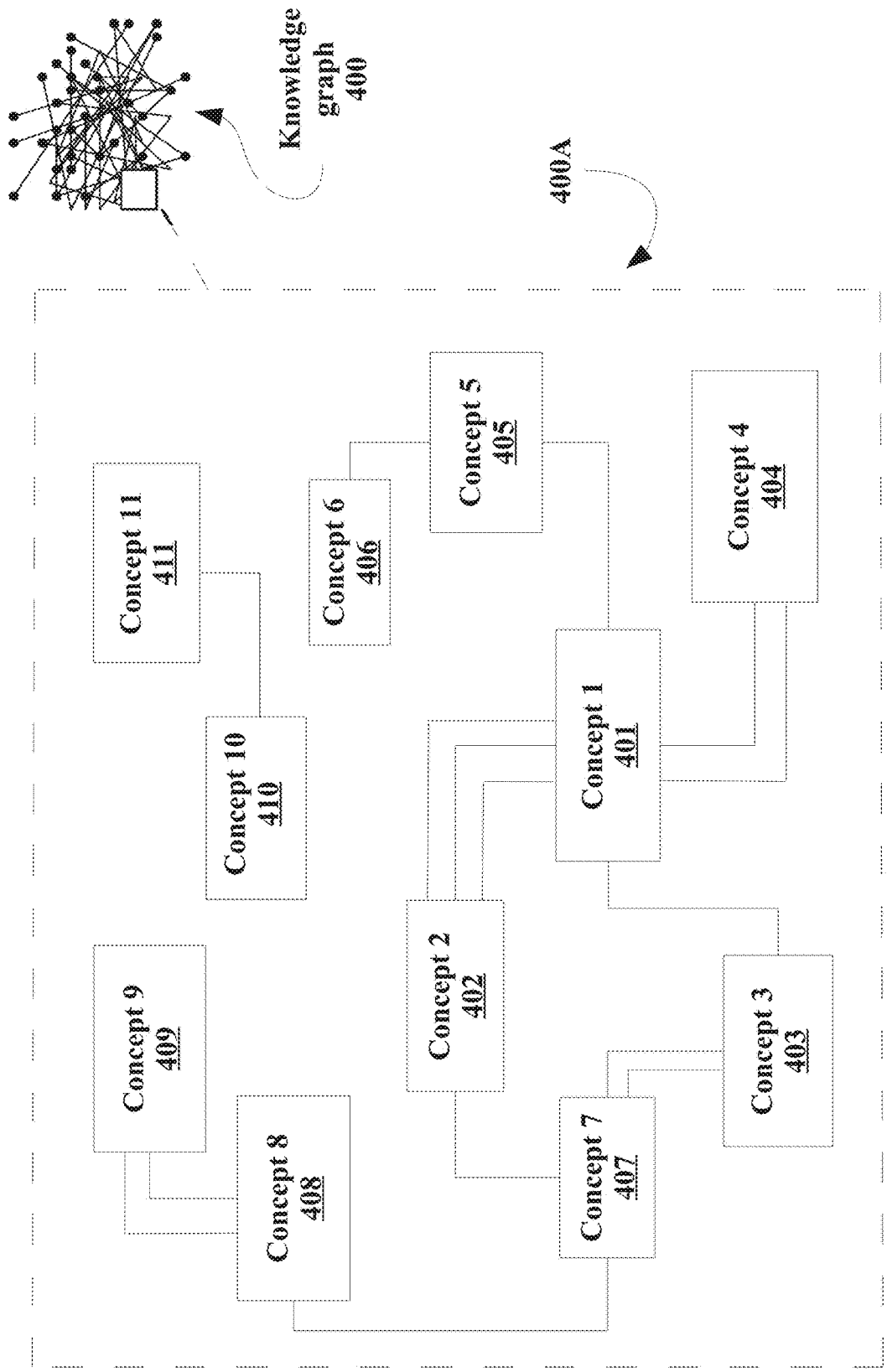
FIG. 4 illustrates an exemplary knowledge graph for generating a set of textual instructions, in accordance with embodiments of the present disclosure.

Now referring to FIG. 4, illustrated is a close-up view of a portion 400A of an exemplary knowledge graph 400 for a recipe book, in accordance with embodiments of the present disclosure. In some embodiments, the knowledge graph 400 is used to validate the feasibility of a given tuple of cooking actions, ingredients and tools. The close-up view of the portion 400A includes eleven nodes 401-411, with each node relating to a different concept. The nodes 401-411 are connected by edges that represent connections between the concepts. For example, if two connected concepts correspond to ingredients and/or actions in a recipe book, an edge connecting them may represent that the ingredients and/or actions are meant to be combined. A computer system may generate the knowledge graph 400 using natural language processing techniques.

In some embodiments, the number of edges connecting two concepts may correspond to a level of relatedness between the concepts. For example, concept 1 401 and concept 2 402 are connected with three edges, whereas concept 1 401 is connected to concept 5 405 by a single edge. This may indicate that concept 1 401 and concept 2 402 are more closely related than concept 1 and concept 5 505. The computer system may generate a relatedness score for two concepts using the number of edges connecting the two concepts together.

In some embodiments, the relatedness score may also consider the relatedness of concepts that, while not directly connected to each other in the knowledge graph 400, are each connected to the same concept. The computer system may look at whether a path can be taken through other concepts to connect the two concepts. For example, a path can be drawn to connect concept 1 401 and concept 6 406 by going through concept 5 405. The length of the path may be considered when determining a relatedness score between two concepts.

The computer system may also consider the number of other concepts that the two concepts are connected to in determining a relatedness score. For example, concept 7 407 is not connected by an edge to concept 1 401. However, concept 7 407 and concept 1 401 are both connected to concepts 3 403 and 2 402. The computer system may determine that, despite not being directly connected, concepts 7 407 and 1 401 are somewhat related. Accordingly, the relatedness score between them may be higher than, e.g., the relatedness score between concept 1 401 and concept 9 409, which are distantly connected to each other, or than concept 1 401 and concept 11 411, which cannot be connected.

In some embodiments, the nodes 401-411 may be generated using "fuzzy logic" and/or concept matching. This may be done to ensure that different words or phrases relating to the same concept are included in a single node. For example, a recipe book may refer to ingredients, such as "produce," "fruit," and "apple" at different points. A computer system using natural language processing techniques and fuzzy logic may determine that all three words refer to the same concept. Accordingly, all three terms may be represented in the knowledge graph using a single node, and any edges between any of the three terms and other concepts may connect to that node.

In some embodiments, the nodes 401-411 can be weighted according to their importance. This may be represented in the knowledge graph 400 by, e.g., making the nodes 401-411 larger or smaller. The nodes 401-411 may be weighted according to the number of edges that connect to the nodes. In various embodiments, the nodes 401-411 may be weighted according to the number of edges that connect to the nodes. In various embodiments, the nodes 401-411 may be weighted according to the importance of the associated concept. For example, concepts relating to final presentation (e.g., on a plate, in a bowl, etc.) may be weighted less than concepts relating to preparation type (e.g., sautéing, baking, boiling, etc.) and accurate measurements (e.g., scaled amount of ingredients needed).

Figure 5:
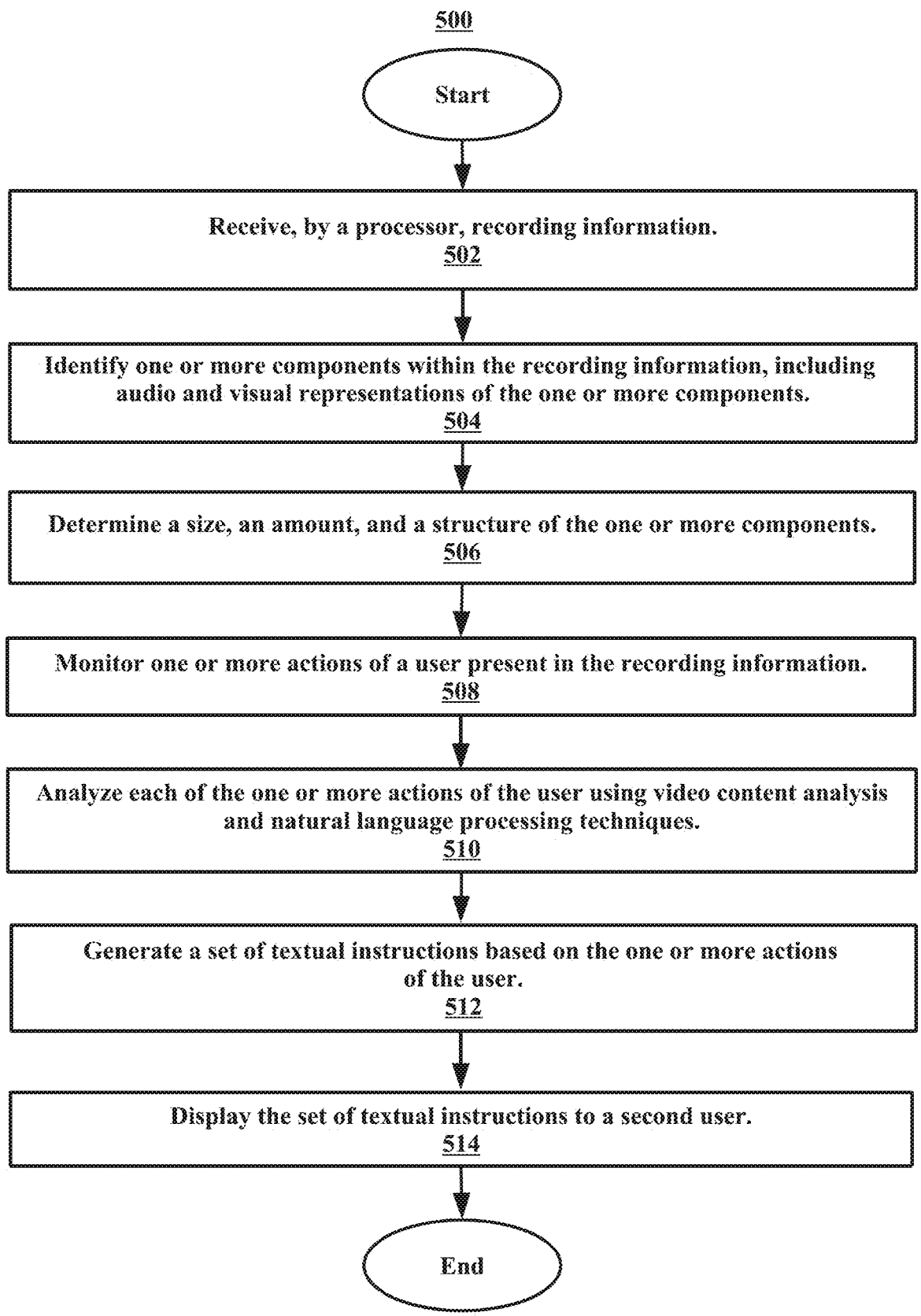
FIG. 5 illustrates a flowchart of an example method for generating an instruction list from a video capture, in accordance with embodiments of the present disclosure.

Referring now to FIG. 5, illustrated is a flowchart of an example method 500 for generating an instruction list from a video capture, in accordance with embodiments of the present disclosure. In some embodiments, a processor may perform the operations of the method 500. In some embodiments, the method 500 begins at operation 502 where a processor receives recording information. For example, a video recorder may be recording a user.

In some embodiments, the method 500 proceeds to operation 504, where the processor identifies one or more components within the recording information, including audio and visual representations of the one or more components, using object detection, object classification, and other computer vision techniques. For example, an application installed on a mobile device identifies a user in the recording area as distinct from other objects in the recording area, such as cooking implements and food items. In some embodiments, the method 500 proceeds to operation 506. At operation 506, the processor determines a size, an amount, and a structure of the one or more components. For example, the processor identifies a bowl of sugar and also determines the amount, consistency, and other details about the sugar (e.g., 1 cup of fine white sugar, etc.). In some embodiments, the method 500 proceeds to operation 508. At operation 508, the processor monitors one or more actions of a user present in the recording information. For example, the processor records the user as the user is moving about the kitchen, adding new ingredients to the preparation, and using different cooking implements to accomplish various cooking tasks.

In some embodiments, the method 500 proceeds to operation 510, where the processor analyzes each of the one or more actions of the user using video content analysis and natural language processing techniques. For example, the processor identifies actions the user is performing and then compares those actions to reference actions, tags and stores the recording information as a commonly understood phrase (e.g., "beating" eggs, "dash" of salt, "toss" salad, etc.) format. In some embodiments, after analyzing each of the one or more actions of the user at operation 510, the method 500 proceeds to operation 512. At operation 512, the processor generates a set of textual instructions based on the one or more actions of the user. For example, the processor generates a recipe in text format based on the recording information it received during the meal preparation process.

In some embodiments, the method 500 proceeds to operation 514, where the processor displays the set of textual instructions to a second user. For example, the processor provides the user with a printer-friendly display of all of the actions that the user performed, and all of the information about each of the ingredient items in a recipe format. In some embodiments, the method 500 is illustrative of the processor generating a set of textual instructions based on recording information received by the processor. In some embodiments, the method 500 is illustrative of the processor generating a video based on a set of textual instructions received by the processor. In some embodiments, after operation 514, the method 500 ends.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
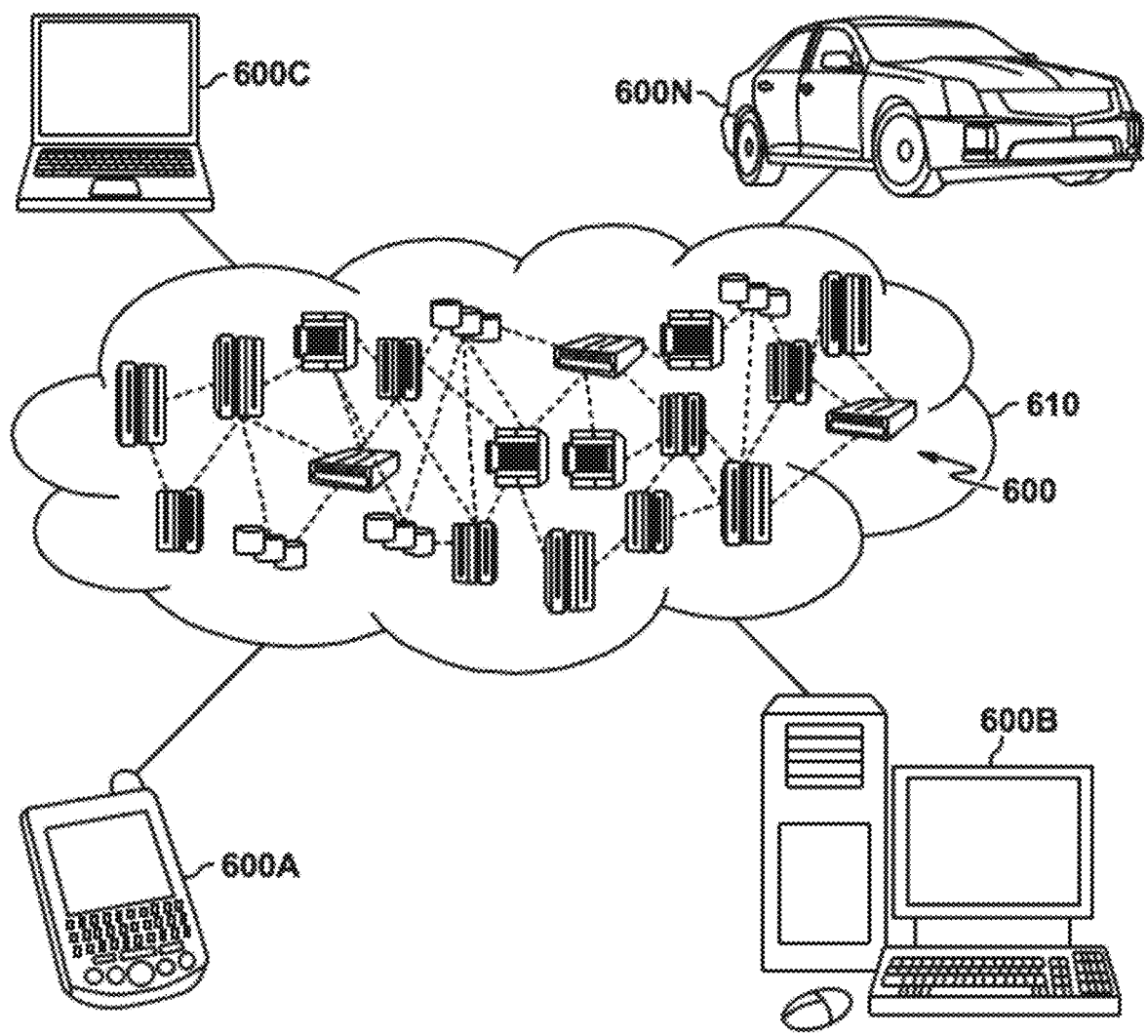
FIG. 6 depicts a cloud computing environment, in accordance with embodiments of the present disclosure.

Referring now to FIG. 6, illustrative cloud computing environment 610 is depicted. As shown, cloud computing environment 610 includes one or more cloud computing nodes 600 with which local computing devices used by cloud consumers, such as, for example, personal digital assistant (PDA) or cellular telephone 600A, desktop computer 600B, laptop computer 600C, and/or automobile computer system 600N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
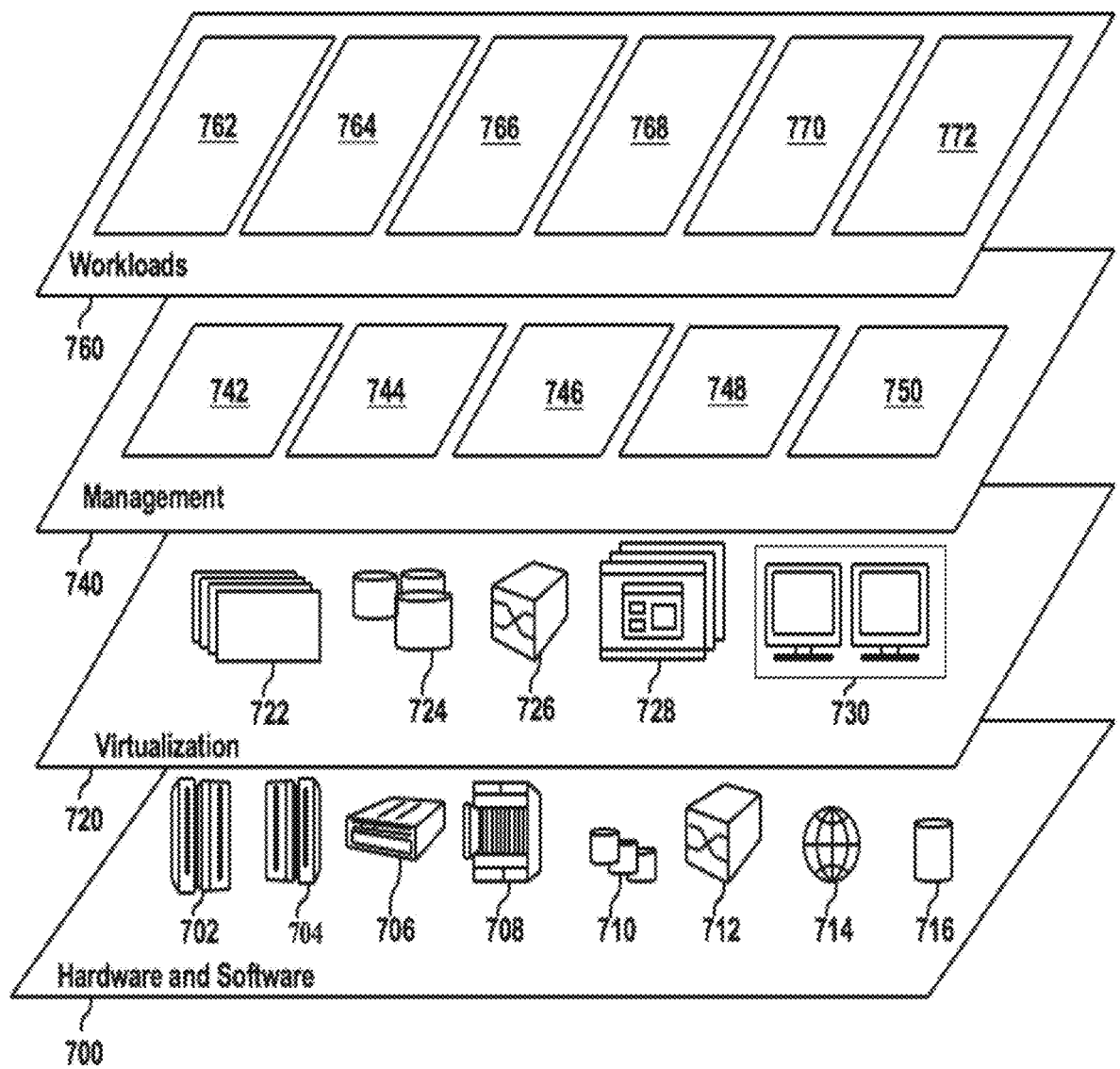
FIG. 7 depicts abstraction model layers, in accordance with embodiments of the present disclosure.

Referring now to FIG. 7, a set of functional abstraction layers provided by cloud computing environment 610 (FIG. 6) is shown. It should be understood in advance that the components, layers, and functions shown in FIG. 7 are intended to be illustrative only and embodiments of the invention are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730.

In one example, management layer 740 may provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment may be utilized. Examples of workloads and functions which may be provided from this layer include: mapping and navigation 762; software development and lifecycle management 764; virtual classroom education delivery 766; data analytics processing 768; transaction processing 770; and mobile desktop 772.

Figure 8:
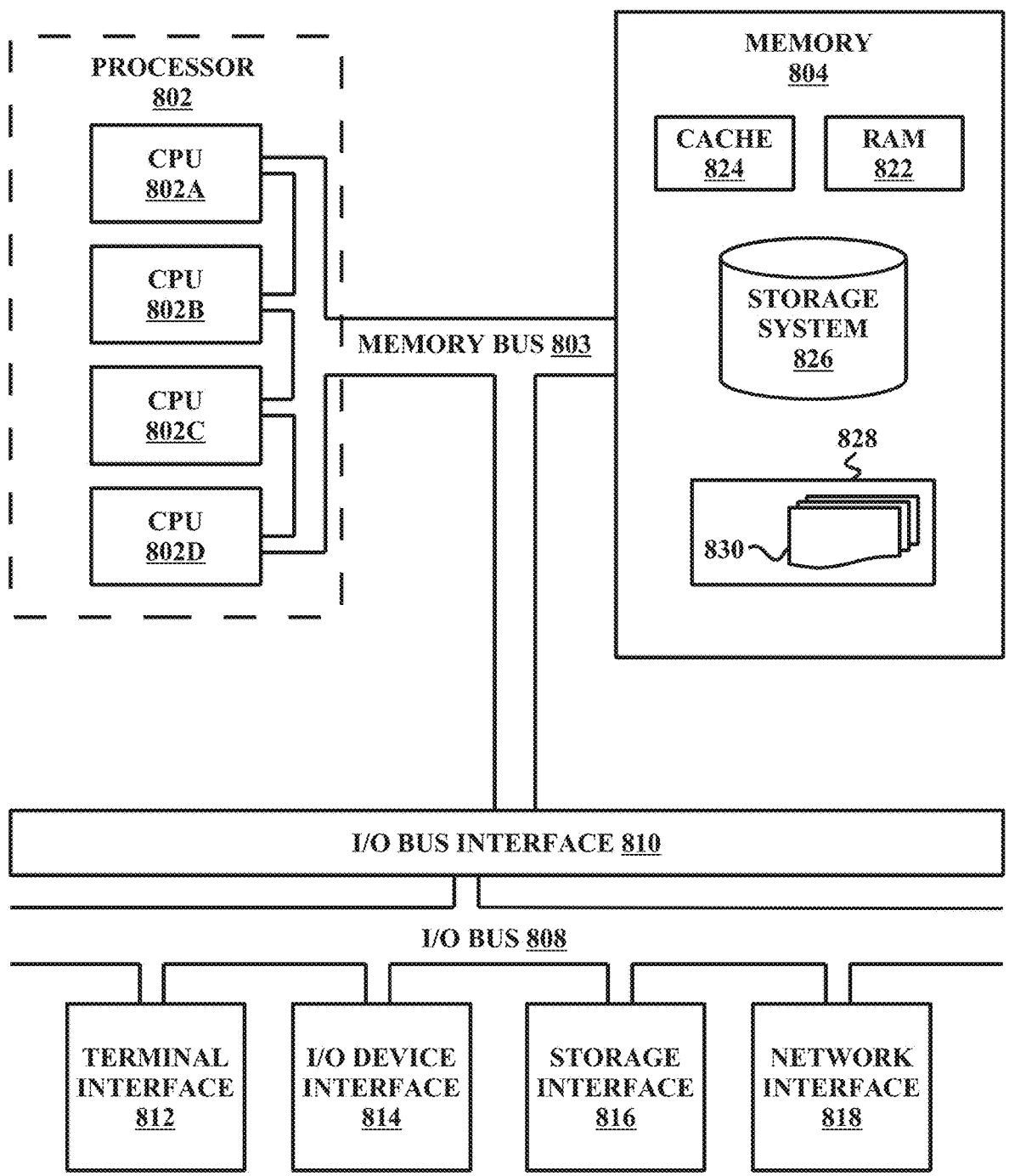
FIG. 8 illustrates a high-level block diagram of an example computer system that may be used in implementing one or more of the methods, tools, and modules, and any related functions, described herein, in accordance with embodiments of the present disclosure.

Referring now to FIG. 8, shown is a high-level block diagram of an example computer system 801 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 816, an I/O (Input/Output) device interface 814, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

System memory 804 may include computer system readable media in the form of volatile memory, such as random access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory subsystem 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smartphone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
receiving, by a processor, recording information;
identifying one or more components within the recording information, wherein the one or more components include audio and visual representations of the one or more components;
determining, for each of the one or more components, a size, an amount, and a structure of the one or more components;
monitoring one or more actions of a user present in the recording information;
analyzing each of the one or more actions of the user, wherein analyzing each of the one or more actions of the user includes video content analysis and natural language processing techniques;

generating a set of textual instructions based on the analysis of each of the one or more actions of the user; and displaying the set of textual instructions to a second user.

2. The method of claim 1, wherein determining the size, the amount, and the structure of the one or more components comprises:
   identifying the dimensions each of the one or more components;
   determining, based on the identified dimensions, a surface area, a volume, and a weight of each of the one or more components;
   accessing a repository, wherein the repository includes reference components;
   comparing structural similarities and differences among each of the one or more components to the reference components stored in the repository; and
   determining, based on the comparing, an arrangement of each of the one or more components.

3. The method of claim 1, wherein monitoring the one or more actions of the user present in the recording comprises:
   parsing the recording into one or more segments;
   grouping the one or more segments by associating the one or more key identified actions as a sequence of actions;
   comparing the one or more key identified actions to one or more reference actions stored in a repository;
   determining, from comparing the one or more key identified actions to the one or more reference actions, that a first key identified action matches a first reference action;
   assigning, based on the determining, a tag to a first segment associated with the first key identified action, wherein the tag identifies content of the first key action;
   predicting one or more subsequent actions associated with the first key action; and
   generating a set of instructions based on the one or more subsequent actions.

4. The method of claim 1, wherein analyzing the video content of each of the one or more actions comprises:
   identifying one or more distinct features of the one or more audio and visual representations of the one or more components that alter the structure of the one or more components;
   determining that the user present in the recording information is performing the one or more actions;
   comparing the one or more actions with reference actions, wherein the reference actions are stored in a repository, and wherein the reference actions include predicted subsequent actions; and
   generating, from a first reference action associated with a first action of the one or more actions, a first predicted action, wherein the first predicted action is subsequent to the first action, and wherein the first predicted action maintains continuity with the first action.

5. The method of claim 4, wherein analyzing each of the one or more actions using natural language processing techniques includes:
   identifying a second action of the one or more actions, wherein the second action corresponds to a natural language phrase;
   comparing the natural language phrase to one or more phrases in a natural language repository; and
   generating, based on the comparing of the natural language phrase to the one or more phrases, a first predicted subsequent phrase, wherein the first predicted subsequent phrase maintains continuity with the natural language phrase.

6. The method of claim 1, further comprising:
   receiving, from the processor, a second set of textual instructions, wherein the second set of textual instructions includes one or more described actions;
   analyzing a repository for existing recording segments that are associated with the one or more described actions; and
   generating a media communication by compiling the existing recording segments.

7. The method of claim 6, wherein analyzing the repository for existing recording segments comprises:
   identifying, in the repository, one or more tags associated with the existing recording segments;
   comparing the one or more tags to the one or more described actions;
   determining, based on the comparing, that a first tag matches a first described action, wherein the first tag and the first described action match by including the same textual instructions; and
   displaying a first existing recording segment associated with the first tag to a second user.

8. A system comprising:
   a memory; and
   a processor in communication with the memory, wherein the processor is configured to perform operations comprising:
   receiving, by a processor, recording information;
   identifying one or more components within the recording information, wherein the one or more components include audio and visual representations of the one or more components;
   determining, for each of the one or more components, a size, an amount, and a structure of the one or more components;
   monitoring one or more actions of a user present in the recording information;
   analyzing each of the one or more actions of the user, wherein analyzing each of the one or more actions of the user includes video content analysis and natural language processing techniques;
   generating a set of textual instructions based on the analysis of each of the one or more actions of the user; and
   displaying the set of textual instructions to a second user.

9. The system of claim 8, wherein determining the size, the amount, and the structure of the one or more components comprises:
   identifying a dimensions of each of the one or more components;
   determining, based on the identified dimensions of each of the one or more components;
   accessing a repository, wherein the repository includes reference components;
   comparing structural similarities and differences among each of the one or more components to the reference components stored in the repository; and
   determining, based on the comparing, an arrangement of each of the one or more components.

10. The system of claim 8, wherein monitoring the one or more actions of the user present in the recording comprises:
    parsing the recording into one or more segments;
    grouping the one or more segments by associating the one or more key identified actions as a sequence of actions;
    comparing the one or more key identified actions to one or more reference actions stored in a repository;

determining, from comparing the one or more key identified actions to the one or more reference actions, that a first key identified action matches a first reference action;
assigning, based on the determining, a tag to a first segment associated with the first key identified action, wherein the tag identifies content of the first key action;
predicting one or more subsequent actions associated with the first key action; and
generating a set of instructions based on the one or more subsequent actions.

11. The system of claim 8, wherein analyzing the video content of each of the one or more actions comprises:
identifying one or more distinct features of the one or more audio and visual representations of the one or more components that alter the structure of the one or more components;
determining that the user present in the recording information is performing the one or more actions;
comparing the one or more actions with reference actions, wherein the reference actions are stored in a repository, and wherein the reference actions include predicted subsequent actions; and
generating, from a first reference action associated with a first action of the one or more actions, a first predicted action, wherein the first predicted action is subsequent to the first action, and wherein the first predicted action maintains continuity with the first action.

12. The system of claim 11, wherein analyzing each of the one or more actions using natural language processing techniques includes:
identifying a second action of the one or more actions, wherein the second action corresponds to a natural language phrase;
comparing the natural language phrase to one or more phrases in a natural language repository; and
generating, based on the comparing of the natural language phrase to the one or more phrases, a first predicted subsequent phrase, wherein the first predicted subsequent phrase maintains continuity with the natural language phrase.

13. The system of claim 8, further comprising:
receiving, from the processor, a second set of textual instructions, wherein the second set of textual instructions includes one or more described actions;
analyzing a repository for existing recording segments that are associated with the one or more described actions; and
generating a media communication by compiling the existing recording segments.

14. The system of claim 13, wherein analyzing the repository for existing recording segments comprises:
identifying, in the repository, one or more tags associated with the existing recording segments;
comparing the one or more tags to the one or more described actions;
determining, based on the comparing, that a first tag matches a first described action, wherein the first tag and the first described action match by including the same textual instructions; and
displaying a first existing recording segment associated with the first tag to a second user.

15. A computer program product comprising a computer readable storage medium having program instructions embodied therewith, the program instructions executable by a computer to cause the computer to perform a method comprising:

receiving, by a processor, recording information;
identifying one or more components within the recording information, wherein the one or more components include audio and visual representations of the one or more components;
determining, for each of the one or more components, a size, an amount, and a structure of the one or more components;
monitoring one or more actions of a user present in the recording information;
analyzing each of the one or more actions of the user, wherein analyzing each of the one or more actions of the user includes video content analysis and natural language processing techniques;
generating a set of textual instructions based on the analysis of each of the one or more actions of the user; and
displaying the set of textual instructions to a second user.

16. The computer program product of claim 15, wherein determining the size, the amount, and the structure of the one or more components comprises:
identifying dimensions of each of the one or more components;
determining, based on the identified dimensions of each of the one or more components;
accessing a repository, wherein the repository includes reference components;
comparing structural similarities and differences among each of the one or more components to the reference components stored in the repository; and
determining, based on the comparing, an arrangement of each of the one or more components.

17. The computer program product of claim 15, wherein monitoring the one or more actions of the user present in the recording comprises:
parsing the recording into one or more segments;
grouping the one or more segments by associating the one or more key identified actions as a sequence of actions;
comparing the one or more key identified actions to one or more reference actions stored in a repository;
determining, from comparing the one or more key identified actions to the one or more reference actions, that a first key identified action matches a first reference action;
assigning, based on the determining, a tag to a first segment associated with the first key identified action, wherein the tag identifies content of the first key action;
predicting one or more subsequent actions associated with the first key action; and
generating a set of instructions based on the one or more subsequent actions.

18. The computer program product of claim 15, wherein analyzing the video content of each of the one or more actions comprises:
identifying one or more distinct features of the one or more audio and visual representations of the one or more components that alter the structure of the one or more components;
determining that the user present in the recording information is performing the one or more actions;
comparing the one or more actions with reference actions, wherein the reference actions are stored in a repository, and wherein the reference actions include predicted subsequent actions; and
generating, from a first reference action associated with a first action of the one or more actions, a first predicted action, wherein the first predicted action is subsequent to the first action, and wherein the first predicted action maintains continuity with the first action.

19. The computer program product of claim 18, wherein analyzing each of the one or more actions using natural language processing techniques includes:
identifying a second action of the one or more actions, wherein the second action corresponds to a natural language phrase;
comparing the natural language phrase to one or more phrases in a natural language repository; and
generating, based on the comparing of the natural language phrase to the one or more phrases, a first predicted subsequent phrase, wherein the first predicted subsequent phrase maintains continuity with the natural language phrase.

20. The computer program product of claim 15, further comprising:
receiving, from the processor, a second set of textual instructions, wherein the second set of textual instructions includes one or more described actions;
analyzing a repository for existing recording segments that are associated with the one or more described actions, wherein analyzing the repository for existing recording segments comprises:
identifying, in the repository, one or more tags associated with the existing recording segments;
comparing the one or more tags to the one or more described actions;
determining, based on the comparing, that a first tag matches a first described action, wherein the first tag and the first described action match by including the same textual instructions;
displaying a first existing recording segment associated with the first tag to a second user; and
generating a media communication by compiling the existing recording segments.

* * * * *